Oct. 21, 1969    K. ZINNKANN    3,473,844
HEIGHT ADJUSTING DEVICE FOR A VEHICLE SEAT
Filed Aug. 2, 1967    3 Sheets-Sheet 1

Inventor
Kurt Zinnkann
BY E. J. Biskup
Attorney

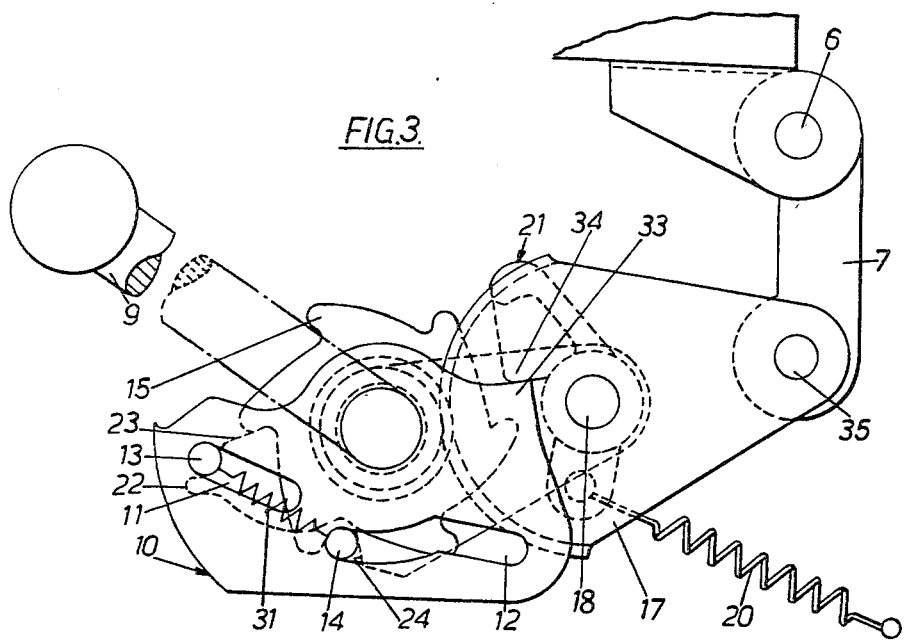
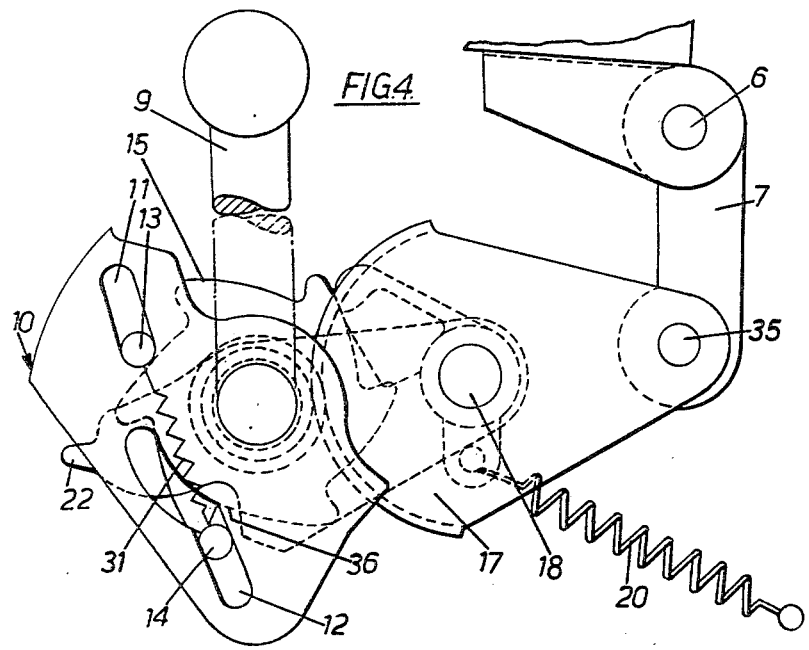

3,473,844
HEIGHT ADJUSTING DEVICE FOR A VEHICLE SEAT
Kurt Zinnkann, Bussfeld, Hesse, Germany, assignor to General Motors Corporation, a corporation of Delaware
Filed Aug. 2, 1967, Ser. No. 657,931
Claims priority, application Germany, Sept. 1, 1966, O 11,927
Int. Cl. B60n 1/02; A47c 1/06
U.S. Cl. 297—345                                    10 Claims

ABSTRACT OF THE DISCLOSURE

An operating lever movable from a mid-position in one direction to raise the seat and in an opposite direction to lower the seat. An operating element drivingly connected to the lever and a freely rotatable ratchet wheel which is rotated by the operating element when the lever is moved in said one direction and is allowed to rotate in an opposite sense under the weight of the seat when the lever is moved in said other direction. The operating element includes a pin to rotate the ratchet wheel and a further pin to limit and then block opposite rotation of the wheel.

BACKGROUND OF THE INVENTION

Field of the invention

The invention relates to a device for adjusting the height of a vehicle seat and comprises an operating lever movable to a first position for raising the seat and to a second position for lowering the seat, an operating element drivingly connected to said lever, first and second coupling pins connected to said element, freely rotatable ratchet means engageable with said first and second pins and a mechanism having a driving connection to said ratchet means for adjusting the height of the seat, the first coupling pin being arranged to turn said ratchet means in seat-raising direction as the operating lever is moved to said first position and the second coupling pin being arranged to first permit limited movement of said ratchet means in seat-lowering direction when the operating lever has been moved to said second position, and then to block said ratchet means against further movement in seat-lowering direction.

Description of the prior art

A known arrangement for adjusting the height of a vehicle seat disclosed in German patent specification 1,106,193 is very costly, since it comprises four pawls which must be moved by special transmission members, both during raising of the seat as well as during lowering of the seat. Furthermore, its operation with certainty demands very accurate machining and mounting of the pawls and of the other numerous individual parts.

DESCRIPTION OF THE INVENTION

Figure 1:
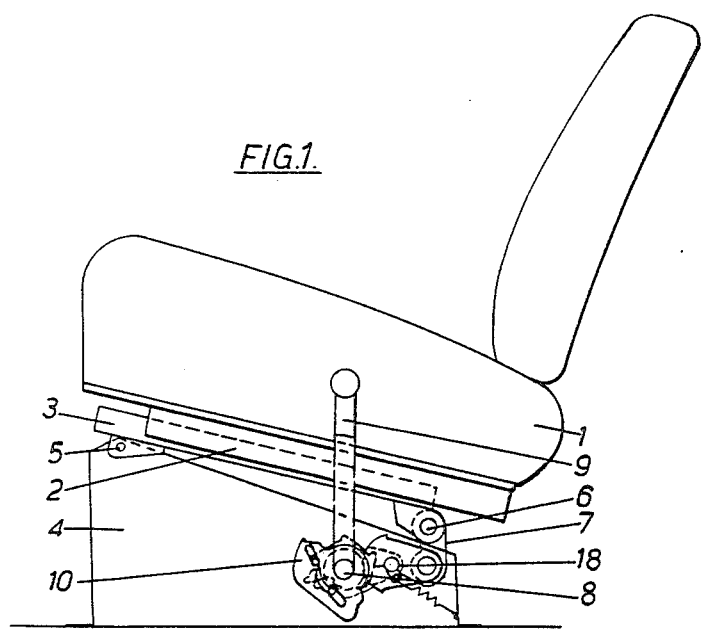

In the drawings: FIGURE 1 is a side elevation of a vehicle seat having an adjusting device according to the invention, FIGURES 2–4, show the adjusting device to an enlarged scale in 3 different positions, FIGURE 5 is a sectional view taken on the line V—V in FIGURE 2 and FIGURE 6 shows a torsion bar spring of the device as seen from the side and in different positions.

The vehicle seat 1 is displaceable in the well known manner in the longitudinal direction of the vehicle by means of slides 2 on guide rails 3. The rails 3 are arranged on a seat base 4 firmly connected with the bottom of the vehicle. At the front of seat base 4, FIGURE 1 shows a tilting spindle 5 for the rails 3. The rear end of each rail 3 is provided with an articulation point 6 for a connection portion 7. The adjusting mechanism is accommodated in the seat base 4, the side walls of the latter serving to mount a shaft 8 which is connected to an actuating lever 9. As shown in FIGURE 5, two operating elements or portions 10 are each arranged rotatively fast on shaft 8 by means of two pins 32. The portions 10 are similar and only one will need to be described. The portion 10 is constructed in U-shape (FIGURE 5) and is provided with slot holes 11 and 12 which are located in both limbs of the U. First and second coupling pins 13 and 14 are guided respectively in slot hole 11 and in slot hole 12. The course and the configuration of slot holes 11 and 12 will be apparent from FIGURES 1 to 3. Slot hole 12 is composed of a portion of circular arc shape and a straight portion having an edge 36. The pins 13 and 14 are interconnected by a tension spring 31 which tends to move pins 13 and 14 towards each other.

Associated with each portion 10 is a ratchet wheel 15 mounted loosely on shaft 8. An associated toothed wheel 16 is drivingly connected to wheel 15 this wheel 16 being in turn engaged by a toothed segment 17. This toothed segment 17 is mounted in a pivotal point 18 and comprises a lever arm 19 which is joined at 35 to the connecting portion 7 and forms a toggle joint with the latter. Also mounted at pivotal point 18 is a pawl 21 which is urged into engagement with ratchet wheel 15 by means of spring 20. A fixed portion 22 is provided with a run-up edge surface 23 for pin 13 and also with a curved track surface 24 for pin 14.

Figure 2:
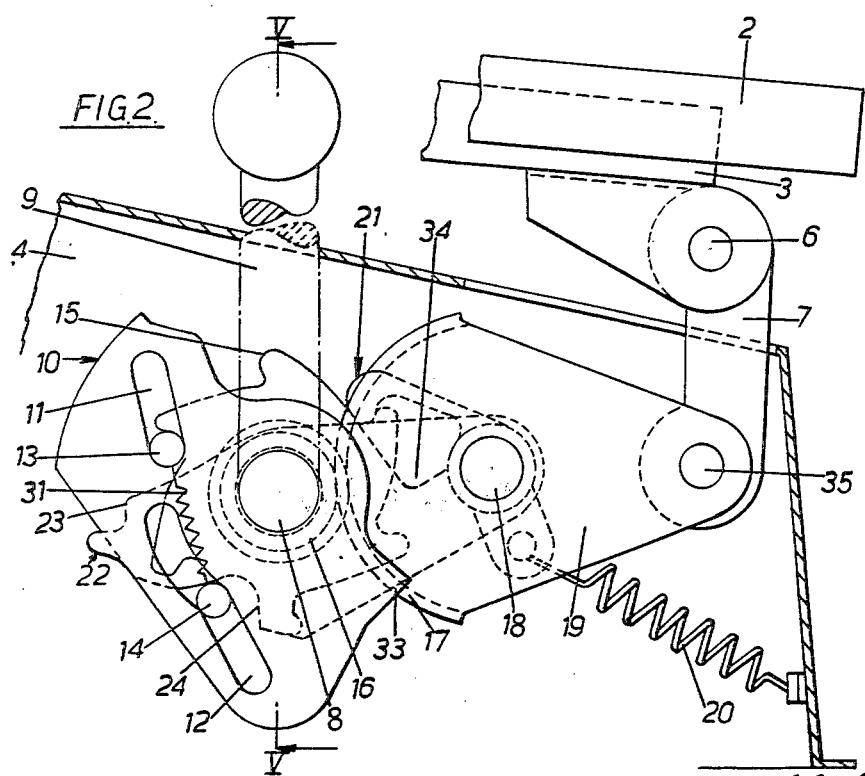
Figure 5:
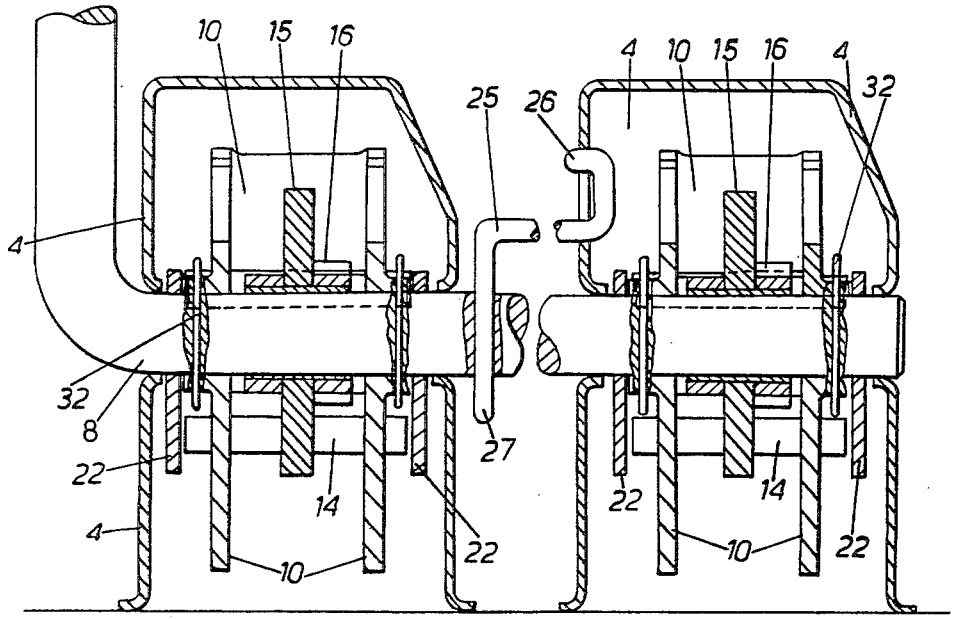
Figure 6:
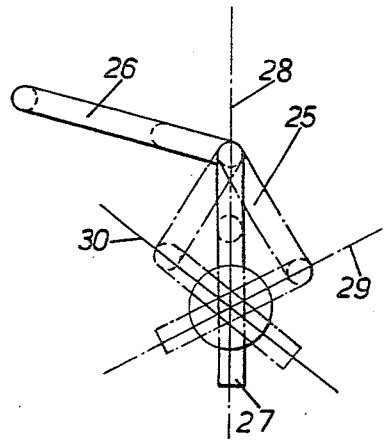

Shaft 8 and lever 9 respectively, which are common to, both left and right hand parts of the device shown in FIGURE 5, are under the action of a torsion bar spring 25 (FIGURE 5) which normally urges shaft 8 in a clockwise direction as seen in FIGURE 2. The torsion springs 25 has a bentover lug 26 which engages in a slot-shaped recess in an inner side wall of seat base 4 and a bentover lug 27 at the other end of spring 25 protrudes into a bore formed in shaft 8. Spring 25 retains the actuating lever 9 in the initial or starting position shown in FIGURES 1 and 2. Its rotation and its position during the individual lever settings is shown in FIGURE 6 which will be further referred to later.

The action of the device will not follow but it will be appreciated that the two parts of the device (see FIGURE 5) for adjusting the height of the seat are similar and the operation of only one will be described. In FIGURES 1 and 2, the actuating lever 9 is in its initial position. The pawl 21 firmly holds the ratchet wheel 15 which would otherwise rotate in an anti-clockwise direction under the weight of the seat 1 acting through connecting lever 7 and lever arm 19, toothed segment 17 and wheel 16. If the seat is to be set higher the actuating lever 9 is moved in a clockwise direction as seen in FIGURES 1 and 2. The pin 13 mounted in slot hole 11 of driving portion 10 carries the ratchet wheel 15 along until it reaches a stop (not shown). Via the toothed wheel 16, toothed segment 17, lever arm 19 and connecting portion 7, the seat is moved thereby upwards by a certain amount. The pawl 21 drops in behind the next tooth and thus again firmly retains ratchet wheel 15. Lever 9 is moved back into the initial position whereupon pin 13 enters the next tooth of ratchet wheel 15 and the process may be repeated so that ratchet wheel 15 is shifted by a further tooth division. The shifting movement may be carried out until the lever arm 19 of tooth sgement 17 and the connecting portion 7 arrive almost in an extended or substantially "in line" position. The displacement may be limited for example by means of a stop (not shown). During the upwards shifting movement, pin 14 in portion 10 has no function to perform.

In order to lower the seat, lever 9 is mover anticlockwise into the position shown in FIGURE 3. Due to the movement of portion 10, pin 13 consequently runs on to the edge 23 of the stationary fixed portion 22, so that it is brought out of the path of movement of ratchet wheel 15. Also, lug 33 on portion 10 strikes against a projection 34 on pawl 21 and thus lifts the pawl out of hodling engagement with wheel 15. Ratchet wheel 15 is now able to rotate, under the weight of the seat, but with one of its teeth it carries pin 14 along in the slot hole 12 until it comes to rest at the steep section of the curved track 24 of fixed portion 22. The result it that ratchet wheel 15 is again firmly held, after it has turned by approximately half a tooth division. Correspondingly, the seat has dropped by about half an upward movement.

If lever 9 is moved back into the initial position, this first of all release pawl 21 which again is urged towards ratchet wheel 15 under the action of spring 20 (FIGURE 3). During this return movement of portion 10, the edge 36 (FIGURE 4) of slot hole 12 causes pin 14 to be shifted radially outwards, so that it releases the ratchet wheel 15. Following the release by pin 14, due to the weight of the seat, ratchet wheel 15 is turned by a further half tooth division until pawl 21 again engages with a a tooth. The operation may be continued until the seat has been completely dropped, this taking place in very small stages. The seat bases 4 shown in section in FIGURE 5, are arranged at a spacing corresponding to the seat width.

In FIGURE 5, reference numeral 26 designates the bent-over extremity of spring 25 engaging in the seat base. In the initial position of lever 9, the bent-over extremity 27 engaging in shaft 8 assumes the position which is indciated by centre line 28 in FIGURE 6 in which the spring 25 is pre-tensioned somewhat so that pin 13 is held in contact with the tooth of ratchet wheel 15. Centre line 29 shows the position after the execution of a movement in the sense of lifting, whereas line 30 denotes the position of lever 9 during lowering of the seat. During rotary movement of shaft 8, spring 25 is stressed somewhat under bending. As will be apparent from FIGURE 5, shaft 8 is of integral construction with lever 9.

I claim:

1. A device for adjusting the height of a vehicle seat, comprising an operating lever movable to a first position for raising the seat and to a second position for lowering the seat, an operating element drivingly connected to said lever, first and second coupling pins connected to said element, freely rotatably ratchet means engageable with said first and second pins and a mechanism having a drive connection to said ratchet means for adjusting the height of the seat, the first coupling pin being arranged to turn said ratchet means in seat-raising direction as the operating lever is moved to said first position and the second coupling pin being arranged to first permit limited movement of said ratchet means in seat-lowering direction when the operating lever has been moved to said second position, and then to block said ratchet means against further movement in seat-lowering direction.

2. A device according to claim 1, in which said operating element is U-shaped and has means defining a corresponding slot of each of said pins.

3. A device according to claim 2, comprising a pawl mounted for pivotable movement about a fixed axis and engageable with said ratchet means to block said ratchet means against rotational movement in one direction.

4. A device according to claim 3, in which said operating element has an arm which is engageable with said part to release the pawl from engagement with said ratchet means.

5. A device according to claim 2, in which said slots are substantially co-axial, one of the slots having an arcuate portion.

6. A device according to claim 5, comprising a spring interconnecting said pins and tending to draw said pins towards each other.

7. A device according to claim 1, comprising a fixed cam portion which has a surface engageable with said first pin to move said pin out of the path of movement of said ratchet means when said lever is moved to said second position.

8. A device according to claim 7, in which said fixed cam portion has a further surface which is engageable with said second pin to block said pin and said ratchet means when said lever is moved to said second portion.

9. A vehicle seat mounting including a device according to claim 1, comprising a seat base divided into two portions, and a shaft connected to said lever and taken through said base portions, an operating element and an associated ratchet means being arranged in each of said base portioins.

10. A mounting according to claim 9, in which said lever and said shaft are of integral construction.

References Cited

UNITED STATES PATENTS

| | | | |
|---|---|---|---|
| 2,527,905 | 10/1950 | Berecki | 297—348 XR |
| 2,652,880 | 9/1953 | Gundersen | 297—347 XR |
| 2,667,209 | 1/1954 | Gundersen | 297—347 XR |
| 2,894,562 | 7/1959 | Peller | 297—348 XR |
| 3,059,890 | 11/1962 | Radke et al. | 248—399 |
| 3,178,148 | 4/1965 | Manke | 297—302 XR |
| 3,218,019 | 11/1965 | Elfes et al. | 248—399 XR |

BOBBY R. GAY, Primary Examiner

GLENN O. FINCH, Assistant Examiner